United States Patent Office 3,681,282
Patented Aug. 1, 1972

3,681,282
SILIATED POLYHYDANTOIN, POLYESTER HY-
DANTOIN SILOXANES AND POLYHYDANTOIN
AMIDE SILOXANES FOR USE AS WIRE
COATINGS
Jerome A. Preston, Fort Wayne, Ind., assignor to
Essex International, Inc.
No Drawing. Filed July 24, 1970, Ser. No. 58,173
Int. Cl. C08f 11/04
U.S. Cl. 260—46.5 E          5 Claims

ABSTRACT OF THE DISCLOSURE

Polyhydantoin polymers modified by reaction with specific silicone compounds provide a cured enamel characterized by a low coefficient of friction. For example, diphenyl hydantoin is reacted with a polyisocyanate or a polyamine to provide the polyhydantoin polymer. The preferred silicones have hydrogen hydroxyl alkyl or aryl radical attached to the silicon atoms, and are not three dimensional polymers, but straight chain. The hydantoin reacts with the reactive radical to produce a polymer having unexpected properties.

BACKGROUND OF THE INVENTION

This invention relates to novel polymeric materials containing hydantoin radicals and silicon radicals.

There has been a continuing demand for improved magnet wire enamel coating which possesses good electrical insulating properties, resistant to heat and solvent attacks, and other desirable properties. U.S. Pat. 3,397,253 discloses an example of such an enamel for magnet conductors.

Magnet wires having such insulating enamel coatings are used in winding electrical coils for use in relays, solenoids and the like. Such magnet wires are coated by passing through a solution of the polymer, and the coating is dried and/or hardened by passing through a drying oven. The dried and coated wire is then wound at high speeds into coils. During the high speed winding process, it has been customary heretofore to apply a lubricating oil to the coated wire in order to reduce friction. After the coil has been wound, it has also been customary to varnish the entire assemby by dipping in varnish. However, the varnish will not adhere well to the wire which has been oiled, and it has been necessary to degrease the wound bobbins before varnishing.

Aside from the necessary steps of applying oil to the wire and then degreasing the wound bobbins, the use of oil in winding the wire into bobbins has other disadvantages. Dust and dirt tend to collect on winding equipment and wires coated with oil. The oil is also a fire hazard since it may be heated by friction developed during winding or from the machinery.

There is, therefore, a demand for enamel coated magnet wire which has a low coefficient of friction so that the use of lubricating oil in the winding process is rendered unnecessary. However, such a low friction enamel wire must also possess good electrical insulating properties, resistance to the relatively high temperature encountered by electrical equipment, and other properties demanded of the non-self-lubricating enamel. One such magnet wire coating is disclosed in my co-pending application Ser. No. 854,285, filed Aug. 29, 1969, for "Sil-Alkyd Coatings for Wire," now Pat. 3,583,885.

It is, accordingly, an object of the present invention to provide a novel enamel coating for magnet wires, characterized by a low coefficient of friction, in which a carefully selected silicone is attached to a polyhydantoin polymer. These coatings do not require the use of oil in their winding, and are compatible with varnish in which wound coils are dipped to improve the insulation thereof. They also possess excellent electrical properties and exceptionally good resistance to heat aging.

Further objects of the invention will become apparent to those skilled in the art from a reading of the following description.

SUMMARY OF THE INVENTION

In accordance with the present invention, there is provided a new magnet wire coating which comprises a polymer containing both hydantoin rings and silicone groups in the polymer. The polymers of the invention may be represented by the following general formula:

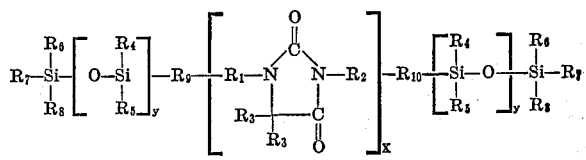

wherein $R_1$ and $R_2$ are radicals of benzene, azobenzene, naphthalene, anthracene, diphenyl, triphenyl methane, diphenyl alkane, diphenylalkene, diphenyl ether, polyphenylether or said radicals substituted with methyl, halogen, acyl, carboloxy, cyano, dialkylamino, nitro, alkoxy groups;

$R_3$ is hydrogen or alkyl or aryl radical;

$R_4$, $R_5$, $R_6$, $R_7$ and $R_8$ are alkyl, aryl, methyl alkyl, carboxalkyl, polyoxyalkyl ether, —H, —OH, —NH$_2$ or —COOH and they may be the same or different;

$R_9$ and $R_{10}$ are alkyl, —N, C=O, methyl alkyl, alkene, polyoxyalkylene ether or ester;

$x$ is a positive integer of a value greater than 1;
$y$ is a positive integer.

In preferred compositions, $R_4$ and $R_5$ are $CH_3$ or $C_6H_5$ groups and the alkyl chains contain from 2 to 24 carbon atoms.

The novel polymers of the invention are prepared by reacting a reactive silicone-containing material with: (1) a hydantoin and a polyisocyanate or polyisothiocyanate; (2) a polymer produced by the reaction of a glycine derivative with a polyisocyanate or a polyisothiocyanate or a polyamine; or (3) a hydantoin and a carboxylic acid or an ester anhydride or chloride of said acid.

DESCRIPTION OF THE PREFERRED EMBODIMENTS

As indicated above, the novel polymers of the present invention may be obtained by reacting a reactive silicone-containing compound with a hydantoin-containing compound. As the reactive silicone-containing material, a silane or a siloxane may be used. As is known in the art, the monomeric silane, such as dichlorodimethyl silane, will react with moisture to form polymeric siloxanes with repeating units therein. The silanes and siloxanes suitable for the purposes of the present invention are disclosed in my copending application Ser. No. 854,285, filed Aug. 29, 1969, for "Sil-Alkyd Coatings for Wire," now Pat. No. 3,583,885, the disclosure of which is hereby incorporated by reference. It will be appreciated that the silanes and siloxanes which are suitable for use in the present invention are generally those having hydrogen, alkyl or aryl radicals attached to the silicon atom and that, if the siloxane is a polymeric material, it is a linear chain rather than one in three dimensional configuration. Resinous polysiloxanes, having three dimensional structural formulas, are not satisfactory for the purpose of the invention because they do not possess the proper lubricity.

Chlorosilanes, alkylated siloxanes, oxygenated siloxanes, hydroxy siloxanes and amine siloxanes and the like having reactive radicals, react directly with the hydantoin or haloacetic acid to form hydantoins with pendant groups along the hydantoin chain. When hydantoins are modified with polyesters, as mentioned in the third method below, I prefer to use organo-siloxanes having two or three —OH, —H or —COOH groups. The —OH and —H react with the acid component, while the —COOH groups react with the polyol component of the polyester.

The preferred siloxanes have the following formula:

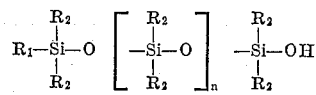

in which $R_1$ is $CH_3$ or phenyl, $R_2$ is $CH_3$, phenyl, OH, H, carboxy alkyl, or methyl alkyl, and $n=2$ to 20 or more; or a siloxane of the general formula

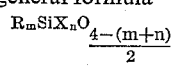

where R is an alkyl radical of less than 5 carbon atoms or a phenyl radical, X is an alkoxy aryloxy or H radical, $m$ has an average value from 1 to 2, $n$ has an average value of from .01 to 3, and the sum of $(m+n)$ is not greater than 4;

The above organosilicon compounds include both monomeric alkoxy-silanes and silanols of the formula

and partial condensates thereof. These partial condensates are polymeric siloxanes having hydrocarbon groups, alkoxy groups and/or OH radicals attached to the silicon. The number of functional (i.e. X) groups per silicon may vary from 1 functional group per 100 silicons to 3 functional groups per silicon. Both the above silanes and the partial condensates are known materials.

The hydrocarbon groups may be alkyl radicals such as methyl, ethyl, propyl, butyl, or phenyl radicals. Any alkoxy groups may be present in the silanes although it is preferred that the alkoxy radicals contain less than 5 carbon atoms, since the corresponding alcohols are more easily removed from reaction mixtures.

Specific silanes which may be employed in this invention are, for example, phenylmethyldiethoxysilane, phenyltrimethoxysilane, dimethyldiisopropoxysilane, diethyldibutoxysilane, monomethyltriisopropoxysilane, diphenylsilanediol, phenylmethylsilanediol and diethylsilanediol. It is understood that either individual silanes or mixtures of one or more silanes may be employed together with partial condensates of individual silanes or mixed silanes.

Other suitable siloxanes include 1,3 bis (4-aminobutyl) 1,1',3,3', tetramethyl disiloxane, carbethoxymethyl tetramethyl disiloxane, hexamethyldisilazane, dimethyl polysiloxane, gamma aminopropyltriethoxy silane, vinyltrichlorosiloxane and hexamethyldisilazane.

The hydantoin-containing component needed for preparing the polymers of the present invention may be prepared in three ways: (1) by reacting a hydantoin and a polyisocyanate or a polyisothiocyanate or a polyamine; (2) by reacting a glycine with a polyisocyanate or a polyisothiocyanate or a polyamine; and (3) by reacting a hydantoin with a carboxylic acid having at least two carboxy groups therein or an anhydride or an ester or a chloride of said acid.

Referring to the first method indicated above for preparing the hydantoin-containing component for use in making the polymer of the present invention, the polyisocyanates, the polyisothiocyanates, and the polyamines which can be used are substantially those disclosed in the Merten et al. U.S. Pat. 3,397,253. The disclosure of said patent, in this respect, is also incorporated by reference herein.

The hydantoins which may be used in the method of the invention to form the hydantoin-containing component are those which will react with a polyisocyanate, a polyisothiocyanate or a polyamine. Examples of such hydantoins are diphenyl hydantoin, dimethyl hydantoin, diethyl hydantoin, mono methylol dimethyl hydantoin, (dimethyl hydantoin methyl)$_3$ amine, methylene bis dimethyl hydantoin, and dihydroxy-diethyl 5,5' dimethyl hydantoin.

Referring to the second method indicated above for making the hydantoin-containing component herein, the glycine derivatives which are suitable for the method of the present invention are those disclosed in the Merten et al. U.S. 3,397,253. It may be stated generally such glycine derivatives are prepared by the reaction of an aromatic polyamine with a haloacetic acid. Representative examples of such glycine derivatives are: N,N'-bis-carbethoxymethyl-4-4'-diamino diphenyl methane; N,N'-bis-carbethoxymethyl-4-4' diamino diphenyl ether.

Referring to the third method for making the hydantoin-containing component for use herein (the poly-carboxy acid, or its anhydrides, or esters, or a reactive halide thereof) such acids or its derivatives are also known to those skilled in this art. Examples of such materials include: trimellitic acid; trimellitic anhydride; pyromellitic acid dianhydride; 3,3',4,4'-benzophenone tetracarboxylic dianhydride; dimethylterephthalate; dimethylisophthalate; terephthaloyl chloride; isophthaloyl chloride; terephthalic acid; isophthalic acid; and 1,1,3, trimethyl-5-carboxy-3-(p-carboxyphenyl)indan.

Preferred glycine derivatives for this process are compounds of the general formula

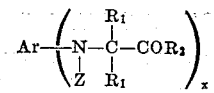

wherein Ar represents an aromatic radical, Z represents hydrogen or $COR_3$, $R_1$ represents hydrogen or alkyl, $R_2$ represents the hydroxyl group or an amino group, an alkylamino-, dialkylamino-, alkoxy- or aroxy group and $x$ is an integer between 2 and 4. $R_3$ represents a dialkylamino group, an alkoxy group or an aroxy group. The glycine derivatives used according to the invention should contain the radical

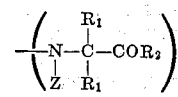

at least twice in the molecule.

The aromatic radical Ar is preferably a radical derived from benzene, azobenzene, naphthalene, anthracene, diphenyl, triphenylmethane, a diphenylalkane, a diphenylalkene, diphenylether, diphenylthioether or a polyphenylether. These radicals may also be substituted once or several times, for example, by alkyl- (methyl-) halogen- (chloro-), nitro-, alkoxy- (methoxy-), dialkylamino- (dimethylamino-), acyl- (acetyl-), carbalkoxy- (carbomethoxy or -ethoxy) and cyano groups. Benzene-, naphthalene-, diphenylmethane- and diphenylether derivatives which may be substituted once or twice by methyl groups and/or chlorine atoms are preferred.

The preparation of the glycine derivatives used as starting materials according to the invention is known and may, for example, be carried out by direct reaction of aromatic polyamines with haloacetic acids or derivatives thereof or by condensation with hydrocyanic acid and aldehydes or ketones, followed by conversion of the nitrile group into, for example, carboxylic acid, ester or amine.

The reaction of aromatic polyamines with haloacetic acid or its derivatives is carried out in an organic solvent, e.g. in ethanol, methanol, acetone, benzene or in an aqueous medium with the use of acid binding agents such as tertiary amines (e.g. pyridine, triethylamine), excess starting amine, soda, potash, sodium bicarbonate, potassium bicarbonate, sodium hydroxide, potassium hydroxide, calcium oxide or calcium carbonate.

Suitable haloacetic acids or derivatives thereof are, for example chloroacetic acid, chloroacetamide, N,N-dialkyl-chloroacetamide (alkyl being preferably methyl, ethyl, butyl), chloroacetic acid esters (e.g. methyl, ethyl, phenyl esters), a-chloropropionic acid esters and a-chloropropionic acid.

Another method consists in condensing aryl polyamines with cyanides (e.g. NaCN, KCN) and oxo compounds (e.g. formaldehyde, acetone, acetophenone) with addition of acids; the nitriles obtained can then be saponified in known manner to form carboxylic acids or converted directly into esters by means of alcoholic hydrochloric acid. Other processes consist in modifying glycine derivatives already prepared, e.g. by esterification of the free acids or aminolysis of the esters.

Suitable aromatic polyamines for use in the invention are compounds having at least two amino groups bound to aromatic nuclei although these must not be arranged in the o- or peri-position. Furthermore, the amines may be substituted in any way desired. Examples of such aromatic polyamines are the following:
m- and p-phenylene diamine,
2,4-, 2,5- and 2,6-toluylene diamine,
diisopropylbenzene diamines,
1,3,5-triaminobenzene,
2,4,6-triaminotoluene,
4,4'-diaminoazobenzene,
2,4,6-triaminoethylbenzene,
1,3,5-triisopropylbenzene-diamines,
2-chloro-1,4-phenylene diamine,
2,5-dichloro-1,4-phenylene diamine,
2,6-dichloro-1,4-phenylene diamine,
2,6-diamino- and 4,6-diamino-5-methyl-1,3-diethyl-benzene
1,3-, 1,4-, 1,5-, 1,6-, 1,7-, 2,4-, 2,5-, 2,7- and 2,8-diaminonaphthalene,
1,4-diaminoanthraquinone,
1,5-diaminoanthraquinone,
4,4'- and 2,4'-diamino-diphenyl ether,
4,4'- and 2,4'-diamino-diphenylthioether,
4,4'-diamino-diphenyldisulfide,
4,4'-diamino-diphenyl,
4,4'-diamino-3,3'- or -2,2'-dichlorophenyl,
4,4'-diamino-3,3'-dialkoxy-diphenyl
4,4'-diamino-3,3'-dimethyl-diphenyl,
4,4'-diamino-diphenylmethane,
2,2-bis-p-aminophenyl-propane,
1,2-bis-p-aminophenyl-ethane,
4,4'-diamino-stilbene,
4,4'-diamino-azobenzene,
4,4'-diamino-diphenylsulfon,
4,4',4''-triamino-triphenylmethane,
diamino-carbazole,
2,2''-dichloro-4,4''-diaminotriphenylether, and
2,4-diamino-6-phenyl-(1,3,5)-triazine.
High molecular weight compounds containing several aromatically bound amino groups e.g. aniline formaldehyde resins, may also be used.

Suitable polyisocyanates and polyisothiocyanates to be heated with the glycine derivatives are, for example, aliphatic, cycloaliphatic or aromatic compounds having at least two NCO— or NCS— groups in the molecule. The following are examples of such polyisocyanates: Polymethylene diisocyanates of the formula $$OCN—(CH_2)_n—NCO$$

wherein $n$ is a number from 4 to 8, benzene diisocyanates which may be substituted with alkyl groups, for example m- and p-phenylene diisocyanates, toluylene-2,4- and -2,6-diisocyanate, ethylbenzene-diisocyanates, di- and tri-isopropyl benzene diisocyanates, chloro-p-phenylene diisocyanates, diphenylmethane diisocyanates, naphthalene diisocyanates, ester isocyanates such as triisocyanato-aryl-phosphoric ester and -thioester, glycol-di-p-isocyanato-phenyl ester, 4,4'-diisocyanato-diphenylether, 1,2-bis-p-isocyanato-phenylethane and 4,4' - diisocyanato - stilbene. Partially polymerised isocyanates having isocyanurate rings and free NCO groups may also be used.

The polyisocyanates may also be used in the form of their derivatives, e.g. the reaction products with phenols, alcohols, amines, ammonia, bisulphite, HCl etc. Individual examples of these are phenol, cresols, xylenol, ethanol, methanol, propanol, isopropanol, ammonia, methylamine, ethanolamine, dimethylamine, aniline and diphenylamine. Relatively high molecular weight addition products, e.g. of polyisocyanates with polyalcohols such as ethylene glycol propylene glycol, trimethylolalkanes or glycerol may also be used.

Instead of the polyisocyanates mentioned, the corresponding thio compounds may be used as well.

The process is generally carried out by heating the two starting components for some time in an organic solvent, the polymer produced remaining in solution. The polymer can be isolated by distilling off the solvent. The quantities of starting compounds may be so chosen that 0.5 to 10 mols of isocyanate or isothiocyanate groups are available per mol of $NH_2$ group, and it is preferable to use 1 to 3 mols of isocyanate or isothiocyanate. Suitable solvents for the process are compounds which are inert to NCO—groups, e.g. aromatic hydrocarbons, chlorinated aromatic hydrocarbons, aliphatic hydrocarbons, esters and ketones. Especially suitable are N-alkylpyrrolidones, dimethylsulphoxide, phenol, cresol and dimethylformamide. Where iso (thio) cyanate derivatives are used, other solvents, such as alcohols or phenols, may also be used. On the other hand, it is also possible to react the components together directly without the use of solvent.

The reaction times vary between 30 minutes and several days and may in special cases lie above or below these limits. The reaction temperatures are chosen to be between 0 and 500° C., depending on the starting material.

It is preferred to work at 20 to 350° C., the best results being obtained in the region of 20 to 230° C.

The condensation reactions may be accelerated by the use of catalysts, e.g. metal alcoholates or tertiary amines.

In the polymerisation according to the invention there takes place, in addition to the condensation of the two reactants, a ring closure reaction to form the hydantoin ring, as can be represented by the following reaction equation:

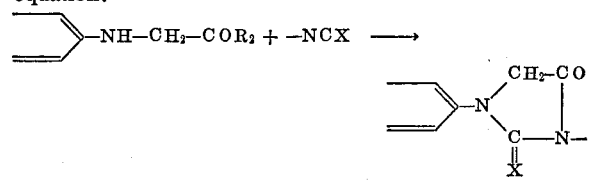

The preferred hydantoin polymers used in this invention contain the recurring unit

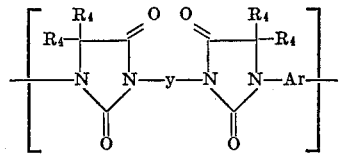

wherein Ar corresponds to the definition already given, $R_4$ represents hydrogen and alkyl having 1 to 6 carbon atoms and $y$ is Ar and additionally alkyl having 4 to 10 carbon atoms (one or more of which may be replaced by oxygen and sulfur) and xylylene. This removing unit may be contained in the polymer about 20 to 5000 times or more.

In another process for preparing the hydantoine polymers of the invention, derivatives of N-carboxy-glycine compounds are heated with polyamines to temperatures between 80 to 500° C. This heating may also be carried out in an organic solvent.

Preferred are N-carboxy-glycine derivatives of the general formula

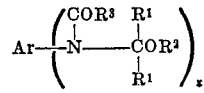

wherein Ar stands for an aromatic radical, $R_1$ is hydrogen or alkyl, $R_2$ is OH, an amino group, an alkylamino group, a dialkylamino group, an alkoxy group or an aroxy group, $R_3$ represents a dialkylamino group, an alkoxy group or an aroxy group and $x$ is an integer between 2 and 4.

Thus, the glycine derivatives to be used according to the invention should contain the radical

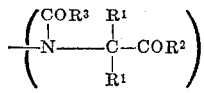

at least twice in the molecule.

The aromatic radicals Ar are preferably the radicals derived from benzene, azobenzene, naphthalene, anthracene, triphenylmethane, diphenylmethane or diphenylether. These radicals may carry one or several substituents for example alkyl- (methyl-), halogen- (chloro-), nitro-, alkoxy- (methoxy-), dialkylamino- (dimethylamino-), acyl- (acetyl-), carbalkoxy- (carbomethoxy- or carboethoxy-) and cyano groups. It is advantageous to use the benzene, naphthalene, diphenylmethane or diphenylether derivatives which may be substituted, once or twice, by methyl and/or chloro functions. The glycine derivatives to be used according to the invention as starting materials prepared according to known methods. By the direct reaction of the corresponding aromatic polyamines with hydrocyanic acid and aldehydes or ketones and subsequent conversion of the nitrile group into the desired carboxyl function, for example carboxylic acid ester or amide or by condensation of the aromatic polyamines with haloacetic acid or derivatives thereof, there are obtained glycine derivatives having a free NH— function which can subsequently be converted into the desired starting materials by means of chlorocarbonic acid alkylester or chlorocarbonic acid arylester. The reaction with the halogen acetic acid or derivatives thereof as well as the chlorocarbonic acid derivatives proceeds in the sense of a Schotten-Baumann reaction, for example in an organic solvent such as ethanol, methanol, acetone or benzene, or in an aqueous medium with the simultaneous use of an acid acceptor, for example a tertiary amine (pyridine, triethylamine), excess starting amine, sodium carbonate, potassium carbonate, sodium hydroxide, potassium hydroxide, calcium hydroxide or calcium carbonate.

This procedure is essentially the same as already described.

The following condensation with chlorocarbonic acid alkylesters or chlorocarbonic acid arylesters, for example chlorocarbonic acid methyl-, -ethyl-, -propyl-, -phenyl- or tolylester, is carried out under substantially equal conditions. It is possible to successively combine several processing steps in one reaction step, for example, condensation reactions wtih chloroacetic acid derivatives and chlorocarbonic acid derivatives. Another method for the preparation of the glycine derivatives to be used according to the invention comprises condensing the corresponding carbamic acid esters having a free NH— group with a chloroacetic acid derivative, in general via the salt of the carbamic ester.

The thus obtained polyfunctional glycine derivatives containing at least twice the group

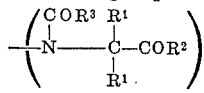

are reacted at elevated temperature with a primary polyamine, i.e. a compound having at least two primary amino groups, yielding the polyhydantoins. The reaction can be represented for example by the following formula

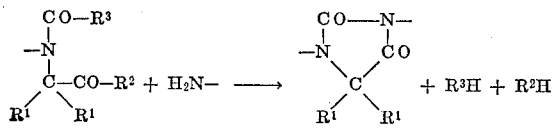

Suitable polyamines for the reaction with the above described glycine derivatives are for example aliphatic, cycloaliphatic and in particular aromatic compounds containing at least two primary amino groups in the molecule. As examples for these polyamines there are mentioned a,w-diaminoalkanes having two to eighteen carbon atoms in the molecule, such as ethylene diamine, propylene diamine-1,2, and -1,3, 1,4-diaminobutane, hexamethylene diamine, and octamethylene diamine, besides their alkyl substitution products and polymers, such as trimethyl-hexamethylene diamine, diethylene triamine, triethylene tetraamine or dipropylene triamine, aminomethyl group-containing aromatics such as 1,3- or 1,4-xylylene diamine as well as the aromatic polyamines mentioned with reference to the preparation of the glycine derivatives.

The process of the invention is generally conducted by heating the two components, preferably, in stoichiometric quantities to elevated temperature in order to effect the aminolysis represented by the above equation. This reaction is preferably carried out, at least towards the end of the reaction, in the presence of an aromatic solvent. Suitable solvents for this purpose are inert organic solvents such as aliphatics, aromatics, halogen hydrocarbons, in particular N-alkylpyrrolidones, dimethylformamide, dimethylacetamide, dimethylsulfoxide, phenol and cresols.

The condensation of the components is in general effected within the range between 100 and 350° C., preferably between 140 and 200° C., by preparing, first in the absence of a solvent, a pre-condensation product the molecular weight of which is increased as the reaction progresses at elevated temperature. The condensation reaction can be activated by the use of an acidic, an alkaline or a metal catalyst (sodium carbonate, sodium hydroxide solution, endoethylene piperazine, triethylamine, phosphoric acid, p-toluene sulfonic acid, sodium phenolate, lead oxide or titanium tetrabutylate).

The condensation degree of the resulting polymers containing several hydantoine groups in the molecule is determined by the choice of the quantitative ratio of the glycine derivative and the amino component as well as by the reaction conditions. Polymers of high molecular weight i.e. about above several thousand can immediately be taken up in a solvent at the end of the condensation or after the desired condensation degree has been achieved.

Particularly suitable are polycondensates containing hydantoin or thiohydantoin rings, which are linked through their nitrogen atoms by bivalent organic groups, such as alkylene groups containing 4 to 10 carbon atoms, phenylene groups, toluylene groups, diphenylene groups and diphenylether groups.

The invention will now be further described with reference to the following specific examples.

EXAMPLE 1

800 grams of N,N' dimethyl acetamide, 60 grams of dimethylhydantoin, 50 grams of P-phenylene diamine, 80 grams of pyridene and 20 grams of 1,3 bis(4-aminobutyl) 1,1',3,3', tetramethyl disiloxane were placed in a suitable reaction flask with stirrer running at room temperature under nitrogen purge.

100 grams of terephthaloyl chloride were added and an exothermic reaction took place. Temperature was held at or below 150° C. for 2 hours, whereupon the reaction product was quenched and washed in methanol.

The precipitated resin was then dissolved in N-methylpyrrolidone to 16% solids and run as a topcoat over a class H polyester magnet wire enamel on an 18 gauge copper wire. The resultant coated wire had a coefficient of friction of .165 whereas the polyester coated wire without topcoat was .33.

EXAMPLE 2

160 parts of N,N'-carboxymethyl diamino diphenyl methane and 125 parts of diphenyl methane 4,4'-diisocyanate are dissolved in 1000 ml. of N-methyl-pyrrolidone heated to 150° C. The temperature is slowly raised to 200° C. and cooked for 12 hours. A nitrogen purge was used throughout the reaction. At the end of 12 hours, 6 grams of carbethoxy methyl tetramethyl disiloxane were added over a period of 10 minutes as viscosity built. The reaction was then stopped by the addition of enough N-methyl-pyrrolidone to reduce the solids to 20% (calculated).

This solution was then placed on 18 gauge copper wire by conventional coating practice. Six passes resulted in a magnet wire that had a .145 coefficient of friction.

EXAMPLE 3

250 parts of diphenylmethane 4,4' diisocyanate were dissolved in N-methyl-pyrrolidone and heated to 150° C. 350 parts of N,N' carbethoxymethyl 4,4' diaminodiphenylmethane heated to 150° C. are added to the reactor and the temperature raised to 240° C. and held for 5 hours. 20 grams of 5,5' diphenylhydantoin and 12 grams of hexamethyldisilazane were added to the mixture. As soon as the viscosity increases and the mass starts to climb the stirrer, enough N-methyl pyrrolidone is added to reduce the solids to 20% (calculated).

The solution was applied to wire and the wire tested as in Example 2. The final product had a coefficient of friction of .147.

EXAMPLE 4

200 grams of diphenylhydantoin, 260 grams of diphenylmethane 4,4' diisocyanate were heated to 250° C. in 1000 grams of cresylic acid and held for 4 hours. 20 grams of a copolymer of dimethyl polysiloxane and polyoxyalkylene ether were added to the mix over a period of twenty minutes. The resin was then quenched with sufficient cresylic acid and aromatic hydrocarbon solvent to reduce the solids to 35%.

This slution was run on wire as in Example 2, and the wire had a coefficient of friction of .148.

EXAMPLE 5

80 grams para methylene dianiline, 20 grams of diphenyl hydantoin, 20 grams of condensed gamma aminopropyltriethoxy silane, 30 grams of 1,3-bis (4-amino butyl) tetramethyl disiloxane were dissolved in 100 grams of pyridine mixed in 900 grams of DMAC (dimethylacetamide). The temperature of the mixture was controlled below room temperature by means of a water jacket. 100 grams of isophthaloyl chloride were added with 20 grams of a copolymer of dimethyl polysiloxane and polyoxyalkylene ether to the reactor and mixed for 2 hours. After an alcohol wash, to precipitate the resin, a solution as in Example 1 was prepared and run on wire as Example 2. The coated wire had a coefficient of friction of 0.127.

EXAMPLE 6

200 grams of monomethyldimethylhydrantoin and 310 grams of biphenic acid were heated to 250° C. in 1000 grams of cresylic acid and held for four hours. 20 grams vinyltrichlorosiloxane, 40 grams pyridine, 4 grams of chloroplatenic acid and 100 grams of cresylic acid were added and the mix continued for 20 minutes. The resin was then quenched as in Example 4.

The solution was blended with a conventional Class H polyester (Isonel 200E, Schenectady Chemical) and isocyanate resin (Mondur S, Mobay Chemical) and run on 18 gauge copper wire by conventional means. The coated wire had a coefficient of friction of .181.

The polymer (before blending with the polyester and isocyanate) had the following formula:

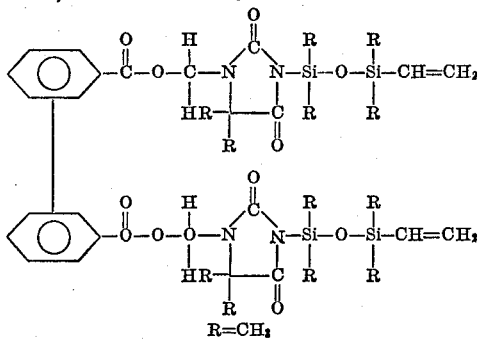

EXAMPLE 7

200 grams of a product of Example 1 were blended at 35% solids in a mixture of cresylic acids and aromatic hydrocarbon solvent with 400 grams of a standard polyester amide-imide resin 35% solids and 400 grams of a terephthalic cyanurate polyester 30% solids, and the mixture run on wire. The resulting coating had a coefficient of friction of .157 and passed all the tests necessary for a Class 180° C. NEMA wire enamel.

EXAMPLE 8

200 grams of the product of Example 2 were substituted for the product of Example 1 and blended with the same materials as set forth in Example 7. The finished enamel was run on wire. The coefficient of friction was .126.

EXAMPLE 9

240 grams of a product of Example 3 were substituted for the product of Example 1 and were blended as indicated in Example 7. The resultant enamel was applied to 18 gauge copper wire. The coated wire had a coefficient of friction of .137.

EXAMPLE 10

In one reaction vessel, 128 grams of trimellitic anhydride were mixed with 128 grams of dimethyl hydantoin. The mixture was heated for one hour at 130° C., the temperature raised to 200° C. and cooked for one additional hour. In another reactor, 97 grams of dimethylterephthalate, 53 grams of diethyleneglycol, 30 grams of trimethylolpropane, 54 grams diphenylsilanediol and one-half gram of zinc acetate alcoholysis catalyst were cooked for two hours at 200° C. Thereupon, both cooked mixtures were combined and the cooking continued until the desired molecular weight and viscosity were developed. The cook was then quenched with cresylic acid. The resulting polymer was diluted to 33% solids with a 60/40 blend of cresylic acid and aromatic hydrocarbon solvent and run in conventional manner as an enamel on an 18 gauge copper conductor. The coated wire had a coefficient of friction of .147 and passed all tests necessary for Class 180° C. NEMA magnet wire enamel.

EXAMPLE 11

To a reaction vessel equipped with a condenser, stirring rod, and gas inlet tube, the following materials were added in the proportions indicated:

| | Parts by weight |
|---|---|
| Dimethyl terephthalate | 250.0 |
| Trishydroxy ethyl isocyanurate | 250.0 |
| Dihydroxydiethyl 5,5' dimethyl hydantoin | 25.0 |
| Diphenyl silanediol | 3.3 |

The temperature was raised rapidly to 120° C., whereupon 3.3 parts of litharge were added with 100 parts of xylene. The temperature was held at 135° C. for 2–6 hours. Nitrogen was used as a purge to remove xylene and other small fractions. The temperature was then allowed to rise to 220–240° C. and when the viscosity reached a clear hard pill stage the mass was quenched with cresylic acid.

The above polymer was diluted using a solvent ratio of 60 parts cresylic acid and 40 parts of aromatic hydrocarbon solvent. The enamel was placed on 18 gauge copper magnet wire. The coated wire had good Class 180° C. NEMA properties and a coefficient of friction of .147.

EXAMPLE 12

Following the procedure set forth in Example 11, the following formula was prepared:

| | Parts by weight |
|---|---|
| Dimethylterephthalate | 350.0 |
| Trishydroxyethylisocyanurate | 250.0 |
| Dihydroxydiethyl 5,5′ dimethyl hydantoin | 108.0 |
| Trimethylolpropane | 16.0 |
| Diphenylsilanediol | 3.9 |
| Litharge (as alcoholysis catalyst) | 0.9 |
| Xylene (as azeotrope) | 100.0 |

The resulting polymer was applied to wire as a base coat and topcoated with an amide-imide resin. The resultant wire passed all tests for NEMA Class 180° C.

EXAMPLE 13

| | Parts by weight |
|---|---|
| Dimethylterephthalate | 115.0 |
| Dihydroxydiethyl 5,5′ dimethylhydantoin | 214.0 |
| Diphenylmethane 4,4′-diisocyanate | 250.0 |
| Litharge | 0.5 |

The dimethylterephthalagate and dihydroxydiethyl 5,5′-dimethylhydantoin were added to a reaction vessel and cooked four hours at 135° C. The litharge was added and the mixture cooked two additional hours at 200° C. Then the diphenylmethane 4,4′ diisocyanate was added and the mass cooked for 30 minutes at 220° C. or until the viscosity reached the clear hard pill stage. The polymer was quenched with cresylic acid, and diluted to 40% solids using a 60/40 blend of cresylic acid and aromatic hydrocarbon solvent. This enamel was then blended 50/50 with Isonel WE–457 polyester enamel (Schenectady Chemical Inc.) and applied to wire in 6 passes as a one-coat enamel (as distinguished from a dual coating of two different materials). The resultant wire passed 260° C. heat shock.

EXAMPLE 14

| | Parts by weight |
|---|---|
| Diphenylmethane 4,4′-diisocyanate | 200.00 |
| Dihydroxydiethyl 5,5′ dimethylhydantoin | 440.00 |
| Hexamethyldisilazane | 4.23 |
| Polycat 200 (cyclamic acid) | 0.12 |

Diphenylmethane 4,4′-diisocyanate and dihydroxydiethyl 5,5′ dimethylhydantoin were charged to a reactor as in Example 11. Temperature was raised to 200° C. over a two-hour period. Cyclamic acid catalyst was then added. Temperature was allowed to rise to 240° C. as viscosity increased. The hexamethyl disilazane was then added. Then sufficient cresylic acid was added to quench the mass and the mass was cooled. The precipitated polymer (enamel) was then reduced in solids to 20% with a 60/40 blend of cresylic acid and aromatic hydrocarbon solvent. The enamel was then blended with the enamel of Example 11 and was applied to wire in conventional manner as a base coat with amide-imide topcoat; also as a six-coat construction without topcoat. The latter had a coefficient of friction .146.

Certain properties of the coated wire of Examples 1–6 and 14 are set forth in the table below:

The invention has been disclosed in detail with particular reference to preferred embodiments thereof, but it will be understood that variations and modifications can be effected within the spirit and scope of the invention as described hereinabove and as defined in the appended claims.

What is claimed is:

1. A method for producing heat resistant resinous polymers having a low coefficient of friction containing both hydantoin radicals and organo-silicon radicals in the polymer backbone which comprises reacting
   (a) a mixture containing a hydantoin and a first member selected from polyisocyanate, polyisothiocyanate and polyamine, or the polymeric reaction product of said hydantoin and said first member, or
   (b) a mixture containing a glycine derivative of the general formula:

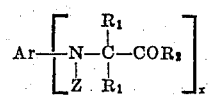

wherein Ar represents an aromatic radical, Z represents hydrogen or $COR_3$, $R_1$ represents hydrogen or alkyl, $R_2$ represents the hydroxyl group or an amino group, an alkylamino-, dialkylamino-, alkoxy- or aroxy group, $R_3$ represents a dialkylamino group, an alkoxy group, or an aroxy group, and $x$ is an integer between 2 and 4, and a second member selected from polyisocyanate, polyisothiocyanate and polyamine, or the polymeric reaction product of said glycine derivative and said second member, with
   (c) a reactive linear, organo-silicon material having reactive —OH, —H, —COOH, alkoxy, amino, aryloxy, silizane or vinyl groups to produce said resinous polymers.

2. A composition of matter which comprises a silicone- and hydantoin-containing polymer having the general formula:

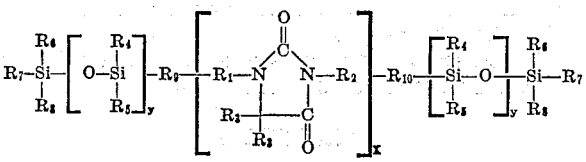

wherein
   $R_1$ and $R_2$ are radicals of benzene, azobenzene, naphthalene, anthracene, diphenyl, triphenyl methane, diphenyl alkane, diphenylalkene, diphenyl ether, polyphenylether or said radicals substituted with methyl, halogen, acyl, carboloxy, cyano, dialkylamino, nitro, alkoxy groups;
   $R_3$ is hydrogen or alkyl or aryl radical;
   $R_4$, $R_5$, $R_6$, $R_7$ and $R_8$ are alkyl, aryl, methyl alkyl, carboxyalkyl, polyoxyalkyl ether, —H, —OH, —NH$_2$ or —COOH and they may be the same or different;
   $R_9$ and $R_{10}$ are alkyl, —N, N=O, methyl alkyl, alkene, polyoxyalkylene ether or ester;
   $x$ is a positive integer of a value greater than 1;
   $y$ is a positive integer.

3. The composition of claim 2 in which the silicone comprises from .15 to 20% by weight of the polymer.

4. An electrical conductor having a coating of the composition of claim 2.

| Typical wire properties | Reference | Result of Example— | | | | | | |
|---|---|---|---|---|---|---|---|---|
| | | 1 | 2 | 3 | 4 | 5 | 6 | 14 |
| Smoothness | Essex Standard | 8 | 7½ | 7 | 5 | 8 | 6 | 8 |
| Snap plus 1X | ASTM D–1676–68 | OK | OK | OK | OK | (¹) | OK | (²) |
| Abrasion unilateral | ASTM D–1676–68 | 1890 | 790 | 525 | 640 | 890 | 820 | 1720 |
| Dielectric | ASTM D–1676–68 | 12,000 | 13,000 | 12,000 | 12,000 | 12,000 | 10,000 | 12,000 |
| Heat shock, 280° C | ASTM D–1676–68 | OK | OK | OK | OK | OK | OK | OK |
| Cut-through temperature | ASTM D–1676–68 | 395° C. | 425° C. | 400° C. | 380° C. | 395° C. | 390° C. | 395° C. |
| Emerson scrape | Emerson Electric Co | 32 lbs. | 10 lbs. | 8 lbs. | 4 lbs. | 6 lbs. | 16 lbs. | 32 lbs. |

¹ OK snap (No. 1X).
² No. (3X).

5. A method for producing a heat resistant resinous polymer having a low coefficient of friction containing both hydantoin radicals and organo-silicon radicals in the polymer backbone which comprises reacting
   (a) a hydantoin with a carboxylic acid having at least two carboxy groups or an anhydride, ester or chloride of said acid with
   (b) a linear, reactive organo-silicon containing material having reactive —OH, —H, —COOH, alkoxy, amino, aryloxy, silizane or vinyl groups to produce said resinous polymer.

References Cited

UNITED STATES PATENTS

| | | | |
|---|---|---|---|
| 3,397,253 | 8/1968 | Merten et al. | 260—830 |
| 3,179,622 | 4/1965 | Haluska | 260—46.5 |
| 2,907,782 | 10/1959 | Pike | 260—448.8 |
| 3,269,982 | 8/1966 | Meals | 260—46.5 |
| 3,278,485 | 10/1966 | Morgan et al. | 260—46.5 |

DONALD E. CZAJA, Primary Examiner

M. I. MARQUIS, Assistant Examiner

U.S. Cl. X.R.

117—135.1; 252—63.7; 260—32.6 R, 33.6 SB, 77.5 CH, 77.5 C, 824, 827